March 14, 1950  A. W. JACOBSON  2,500,314
ALTERNATING CURRENT MOTOR CONTROL
Filed Aug. 10, 1944
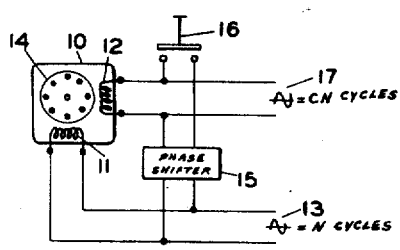
FIG. 1
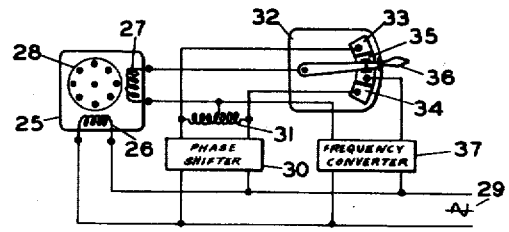
FIG. 3
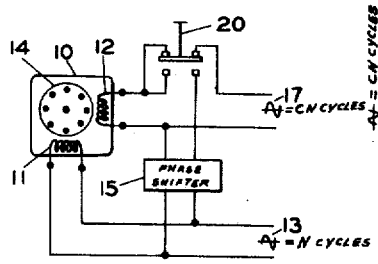
FIG. 2
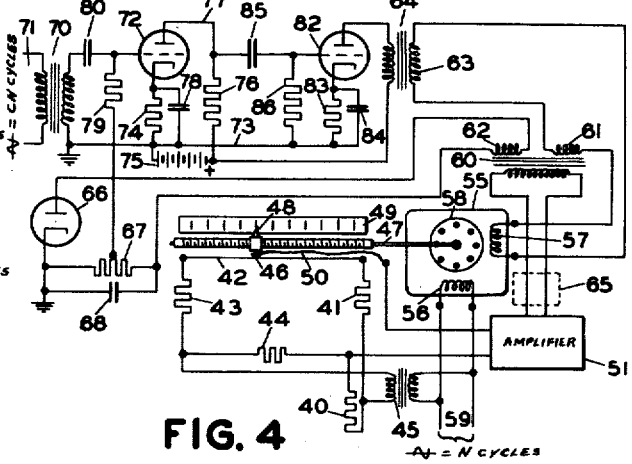
FIG. 4
FIG. 5
FIG. 6
INVENTOR.
Abraham Walter Jacobson
BY
E. C. Sanborn
Attorney Patented Mar. 14, 1950

2,500,314

UNITED STATES PATENT OFFICE 2,500,314

ALTERNATING CURRENT MOTOR CONTROL

Abraham Walter Jacobson, New Haven, Conn., assignor to The Bristol Company, Waterbury, Conn., a corporation of Connecticut Application August 10, 1944, Serial No. 548,820

2 Claims. (Cl. 318—207)

This invention relates to electric motor control systems and circuits, and more especially to the control of small alternating-current motors and of servomotors in such apparatus as automatic regulators, steering mechanisms and self-balancing networks applying null principles in the measurement of electrical magnitudes. In the majority of applications of servomotors it is desired that the performance of the balancing mechanisms, or whatever apparatus is being adjusted by said servomotor, be as nearly as possible critical in its characteristic. That is, the ideal performance would involve the adjusted elements responding instantaneously to any change in the commanding magnitude, and coming to rest abruptly at the newly determined balance point or condition. As the absolute attainment of this ideal is, of course, rendered impossible due to the property of inertia possessed by all bodies, it has been customary to approximate the desired condition by providing the motor or associated mechanism with some form of braking device, either mechanical or electrical, which, applying a suitable counter-influence as a balance condition is approached, tends to offset the overshooting effect of inertia, and more or less abruptly bring the mechanism to rest as the balance point is attained.

It is an object of the present invention to provide electrical means for damping or braking a servomotor as a balance point is approached.

It is a further object to provide electrical braking means which shall be wholly external to the controlled motor, and therefore readily adaptable to a conventional form of motor without electrical or structural modification of the same.

It is a further object to provide braking means of the above nature, in which the retarding influence upon the moving part of the motor shall be at a maximum as the balance point is approached and shall be withdrawn to a greater or less degree as the elements of the balancing system depart from a balanced condition.

It is a further object to provide a braking system of the above nature which shall be effective without respect to the direction of rotation of the motor to which it is applied.

Other features and advantages of the invention will be hereinafter described and claimed.

In carrying out the purposes of the invention in the embodiments here illustrated, it is proposed to provide a servomotor of the class having two geometrically displaced windings, one continuously energized from a supply of alternating current having a fixed frequency, and the other with alternating current of the same frequency, but of an intensity and phase-position depending upon the extent and direction of departure of the controlled system from a balance condition, and to superimpose upon said last-named current supplementary current having a frequency differing to a material degree from that of said supply. In such an arrangement, the electromagnetic forces derived from the interaction of said currents of supply frequency will be such as to cause said motor to operate with an intensity and in a direction related to the magnitude of the variable current and its phase position with respect to that of the constant alternating excitation; and, while the reaction between the supplementary current upon the magnetic field derived from the supply frequency will not be such as to produce any tendency for continuous rotation of the motor, the field produced by said current will react with the moving conductors of the motor to produce a retarding effect substantially independent of the frequency of said current.

Because of the relative ease with which whole multiples of a given frequency of alternating current may be obtained from said frequency by the use of non-linear networks or other devices involving no moving parts, it is in general preferable that the supplementary current utilized to provide a retarding effect on the motor under control have a frequency so related to that of the supply; and both theoretical computations and experimental data demonstrate that eminently satisfactory results may be obtained by the use of a frequency double that of the source of supply.

In the drawings:

Figs. 1 and 2 are diagrammatic representations of simple motor controls embodying the principle of the invention.

Fig. 3 is a diagram of a reversible motor control embodying the principle of the invention.

Fig. 4 is a diagram of an electronic control circuit whereby the principle of the invention may be expediently utilized in a self-balancing bridge network.

Fig. 5 is a diagram of a ferromagnetic induction modulator inherently embodying the principle of the invention.

Fig. 6 is a diagram of the device shown in Fig. 5 applied to the recording of thermoelectrically determined temperature values.

Referring now to the drawings:

Fig. 1 is a diagram of a simple control circuit adapted to the operation of an induction motor by current derived from an A.-C. supply source having a specified frequency, and the braking of the same motor by a current of another frequency introduced in one of its windings. A motor 10 has wound upon its stator structure two primary windings 11 and 12, geometrically displaced from one another, the former adapted to be continuously energized from a suitable source 13 of alternating current having a fixed frequency and voltage, said frequency value being referred to as "N" cycles per second, and the latter winding having terminals adapted for energization from either or both of two sources presently to be described. The motor 10 is provided with a rotor member 14 having thereon a short-circuited secondary winding, whereby, according to the well-known principle of the induction motor, torque may be developed in said rotor by the interaction of the alternating magnetic fields established by currents in the primary windings upon currents induced in said secondary winding by said alternating fields. In order that a starting torque be developed in an induction motor it is essential that the field produced by the primary windings be progressive or "rotating" in its nature; and this demands that the two primary windings be not only geometrically displaced in the sense of rotation, but also energized by currents differing in time-phase. To this end, there is provided a phase-shifting transformer 15, or equivalent phase-shifting device, adapted to be energized from the A.-C. source 13, and to produce an output voltage of the same frequency as that of the supply, but having a definite time-phase displacement therefrom. The output terminals of the phase-shifting transformer 15 are connected, in series with a suitable switch 16 (here shown as of the normally-open push-button type) on which the primary winding 12 of the motor 10 may be energized and de-energized at will.

In the apparatus as thus far described there is provided a two-phase induction motor of a conventional type, in which energization of the primary winding 11 alone will not cause a starting torque to be developed, but in which, with closure of the switch 16, the rotating field produced by the combined action of the two primary windings will cause to be induced in the short-circuited secondary winding of the rotor 14 such currents, as, reacting upon the stator field, will set up a torque and cause the rotor to revolve in a sense determined by the relative geometrical and phase displacements of the primary windings and their energizing currents.

Upon opening of the switch 16, the stator will remain energized by current in the winding 11; and, according to the design and proportioning of the motor 10, the rotor will either continue to revolve in accordance with the principle of the single-phase induction motor, or lacking a sufficient intensity of rotating or progressing field, will by its own inertia coast to a position of rest.

In order to obtain the desired retarding or braking action, there is provided for the field 12 a supplementary source of excitation 17. This source comprises a source of alternating current having a frequency differing materially from that of the supply 13; and the connection with the winding 12 is made such that currents from the sources 13 and 17 may flow simultaneously and without mutual interference through said winding. With connections as shown in Fig. 1, the winding 12 is continuously energized from the source 17, while, as hereinbefore pointed out, the winding 11 is continuously energized from the source 13. If the frequencies of the two sources differed by but a small amount, e. g., one cycle per second, the resultant tendency would be for the rotor 14 to oscillate with a frequency representing that difference; but as the disparity between the respective frequencies is made great, the oscillatory tendency is absorbed by the inertia of the rotor, and either disappears entirely, or is apparent only in a slight vibratory effect. It has been found in practice that optimum results are obtained when the frequency of the auxiliary source 17 bears to that of the supply source 13 a ratio which is a whole number (preferably even) which may be designated as "C," whence the frequency of the auxiliary source may be referred to as "CN" cycles per second. It is within the spirit of the invention that the value of C might be zero, in which case the supplementary source of excitation would be direct current.

When the switch 16 is closed, permitting alternating current of normal supply frequency to flow in the winding 12 simultaneously with current from the source 17, the normal frequency component of the current flowing in said winding will react in the manner hereinbefore set forth with that flowing in the winding 11 to cause rotation of the rotor 14. While the current from the source 17 will not appreciably affect the rotative tendency of the moving part, it will provide an alternating field of corresponding frequency which will be cut by the conductors of the rotor winding, causing short-circuit or eddy currents to flow therein, and introducing a corresponding damping action upon the rotor without respect to frequency of the generating flux. If the intensity of the normal frequency current be made sufficient to overcome this damping action, the rotor will operate, but will be subject to a permanently applied retarding influence which, to some extent, will tend to reduce the speed of the operation when current of the normal supply frequency is flowing in the winding 12. Upon opening of the switch 16, and removal of normal frequency energization from the winding 12, the effect of eddy currents set up in the rotor due to the interaction of its winding with the flux produced by the supplementary current will quickly bring the rotor to rest. The magnitude of the supplementary current flowing in the winding 12 may be adjusted to such a value that, while its effect is not sufficient to interfere seriously with operation of the motor when subjected to two-phase energization, it will be sufficient to overcome any tendency of the motor to operate under single phase excitation and will provide a positive braking effect. The flux due to the continuous excitation of the primary winding 11 also interacts with the moving conductors of the rotor 14 to produce a certain retarding action; but this effect is to such an extent involved with the forces tending to produce rotation as a single-phase motor that any attempt to utilize said flux for braking purposes seriously restricts the flexibility of design and operation of the apparatus, and is usually practicable within an exceedingly narrow range of operating conditions.

While it is quite practicable to utilize for braking purposes the retarding effect of a supplementary current of other than normal operating frequency, continuously applied as in Fig. 1, I provide in Fig. 2 for material improvement in the efficiency of operation through arrangements for applying the supplementary current to the stator winding alternatively to the driving current, so that the two currents do not flow in said winding simultaneously. The arrangement shown in Fig. 2 is in all respects identical to that shown in Fig. 1, with exception of the fact that the normally open switch 16 shown in Fig. 1 is replaced by a double-throw switch 20. Said switch 20 is normally maintained in a position to apply current from the supplementary source 17 to the primary winding 12 of the motor, and adapted, when manually actuated, to interrupt connections between said source and said winding, and to place the latter in communication with the output terminals of the phase-shifting transformer 15. It will be seen that, with the arrangement shown in Fig. 2, the braking influence of the current derived from the source 17 will be present in the motor at all times excepting when the switch 20 is thrown to the operating position. At that time the motor will operate freely as a two-phase motor without any retarding effect due to supplementary current, and, as soon as the driving influence is removed, the supplementary current will flow in the stator winding, introducing the retarding effect, whereby, as hereinbefore set forth the motor will quickly be brought to rest.

In Fig. 3 is shown a system whereby the principle of the invention may be applied to the control of a reversible motor in such a manner that the retarding effect is present only at those times when the motor is not subjected to normal driving influences. A motor 25 similar in all respects to the motor 10 shown in Figs. 1 and 2, has wound upon its stator structure two mutually displaced primary windings 26 and 27 and is provided with a rotor member 28 having thereon a short-circuited secondary winding. The primary winding 26 is continuously energized from an alternating current source 29 of constant frequency and voltage. A phase-shifting transformer 30 has its primary terminals connected to the source 29, and its secondary terminals to an inductive winding 31 having a mid-tap, whereby there may be obtained a potential midway between that of the output terminals of said phase-shifting transformer. In certain types of phase-shifting apparatus, it is practicable to include such a mid-tap as a part of the transforming or converting unit, in which case the tapped inductance 31 will not be necessary. A three-point switch 32 having end contacts 33 and 34 and an intermediate contact 35 adapted to be alternatively engaged by a movable contact arm 36, has said end contacts 33 and 34 directly connected to the output terminals of the phase-shifting device 30. The terminals of the primary winding 27 of the motor 25 are connected respectively to the mid-tap of the inductance 31 and to the movable contact arm 36.

Also supplied from the source 29 is a frequency converter 37 adapted to provide at its output terminals an alternating voltage of suitable magnitude, and of frequency differing from that of the source. Frequency converters having no moving parts are commonly available, and need not here be described. A device for producing an output frequency three times that of the supply is described in the book "Measurement of Inductance, Capacitance, and Frequency" by Campbell and Childs (MacMillan, London, 1935) page 38. Devices whereby a double frequency may be derived from an A.-C. source are described in U. S. Letters Patent No. 2,324,634, granted to H. J. McCreary July 20, 1943, and in Patent No. 2,349,057, granted to H. F. Storm, May 16, 1944.

The operation of the apparatus set forth in Fig. 3 will be apparent. With the contact arm 36 engaging end contact 33, the winding 27 of the motor 25 will be connected between the midpoint of the inductive winding 31 and the left hand output terminals of the phase-shifting transformer 30 as seen in the drawings. There will thus be applied to said winding an alternating potential having a certain predetermined phase relation to the supply voltage as impressed upon the winding 26, whereby the rotor of the motor 25 will tend to rotate in a certain direction. With the contact arm 36 engaging the end contact 34 of the switch 32, it will be apparent that the polarity of the alternating voltage applied to the winding 27 will be directly opposite to that which existed when said contact arm engaged the contact 33. In other words, displacement of the contact arm 36 from contact 33 to contact 34 will result in a complete reversal of the phase position of the alternating voltage applied to the winding 27, whereby the direction of rotation of the rotor will be reversed. With the contact arm 36 in engagement with either of said end contacts, no voltage other than that of supply frequency will be applied to the motor winding. If the contact arm 36 be moved to the mid-position, where it engages neither of end contacts 33—34 but does engage the contact 35, there will be no current of the supply frequency flowing in the winding 27, but said winding, on the other hand, will receive from the frequency converter 37 a voltage which, while contributing nothing to the torque of the motor, will provide a braking effect as hereinbefore set forth, whereby the motor if running, will quickly be brought to rest. There has thus been provided a reversible control embodying the principles of the invention.

In Fig. 4 is shown an application of the principle of the invention to the automatic balancing of an A.-C. bridge network utilized in the measurement of temperature. A temperature-sensitive bulb 40 having a predetermined electrical resistance value at a given temperature and formed of material having a known temperature coefficient of electrical resistivity, is exposed to a temperature to be measured and is connected with other resistance units in a circuit comprising a Wheatstone bridge network. Said network includes, in addition to the variable resistance bulb 40, at least three other arms, which, taken in order around a closed loop, may be enumerated as follows: a resistance unit 41 having a fixed value preferably equal to the nominal resistance of the bulb 40 at said predetermined reference temperature, an arm comprising a slide wire portion 42 of resistance value approximating the change in value of the bulb 40 over the operating range of temperature and a fixed portion 43 equal in value to the unit 41, together with a standardizing arm 44 also equal to the arm 41. The point of junction of the bulb 40 and the arm 41, and the point of junction of the arms 43 and 44 are connected to the output terminals of an isolating transformer 45 having suitable secondary voltage rating.

Electrically engaging the slide wire 42 is a movable contact 46 adapted to be translated along said slide wire by means of a lead screw 47, and carrying an index or pointer 48, which, in cooperation with a juxtaposed graduated scale 49, provides an indication of the translated position of said contact. The contact 46 is connected by means of a flexible conductor or equivalent 50 to an input terminal of an amplifier 51, and the other input terminal of said amplifier is connected to the point of junction of the bulb 40 and the resistance arm 44. There is thus constituted a bridge circuit in which, upon the application of a suitable alternating voltage from the terminals of the isolating transformer 45, and by proper proportioning of the respective arms, there will be applied to the amplifier 51 an alternating potential which may be varied in intensity and phase position by changes in the relative values of said arms, and which, by suitable positioning of the movable contact 46 with respect to the slide wire 42, may be reduced to zero, corresponding to a balanced condition in the bridge network; whereupon the reading of the index or pointer 48 with respect to the scale 49 becomes a measure of the temperature to which the bulb 40 is exposed. It is of course understood that, while the bridge network has been described as having its arms nominally of equal value, the desired proportionalities can be obtained with other relative values, all of which is well-known in the art of electric measurement in general and electrical thermometry in particular.

A motor 55 similar in all respect to those shown in the preceding drawings, has wound upon its stator structure, two mutually displaced primary windings 56 and 57, with a rotor member 58 having thereon a short-circuited secondary winding. The rotor 58 is operatively connected to the lead screw 47, whereby to translate the movable contact 46 along the slide wire 42 in a direction dependent upon the direction of rotation of said rotor. The primary winding 56 is continuously energized from an alternating current source 59 of constant frequency and voltage, from which source also is energized the primary winding of of the transformer 45.

To the output terminals of the amplifier 51 is connected the primary winding of a transformer 60, having two secondary windings 61 and 62, from which may be derived electrically isolated alternating voltages of similar phase position, corresponding to that of the output of said amplifier. The secondary winding 61 is connected to the terminals of the motor winding 57 in series with the secondary winding 63 of a transformer 64, said last-named winding having an impedance value so low as not materially to obstruct the flow of current of normal supply frequency between the secondary winding 61 and the motor winding 57.

Neglecting for the moment the function of the secondary winding 62 and that of the transformer 64 (presently to be explained) the apparatus as thus far set forth constitutes a self-balancing alternating-current temperature-sensitive Wheatstone bridge adapted to continuous measurement of the temperature to which the bulb 40 is exposed. Upon the bridge network developing a condition of unbalance, the alternating potential due to said condition will be applied to the input terminals of the amplifier 51, thereby causing the transformer 60 to be energized and to develop across the output terminals of each of its secondary windings an E. M. F. dependent in intensity and in phase position upon the magnitude and sense of unbalance of the bridge network. The output E. M. F. of the secondary 61, being applied to the primary winding 57 of the motor 55, will cause said winding to produce an alternating flux which, combined with that set up by the continuously energized winding 56, will produce a rotating field and cause the rotor 58 to revolve with a speed and in a direction dependent upon the unbalance of the bridge network, thus tending to position the movable contact 46 along the slide wire 42 in a sense to restore the balance of the bridge, and provide on the scale 49 an indication of the pointer 48 representative of the temperature under measurement. The shift of phase of the output voltage of the transformer 60, corresponding to a change in the sense of unbalance of the bridge network will be 180 electrical degrees, corresponding to a complete reversal; and, should not the angular relation of the corresponding vectors to that representing the potential continuously applied to the winding 56 be such as to give suitable torque to the motor, optimum conditions may be attained either by introducing a phase-shifting transformer 65 (shown dotted in Fig. 4) corresponding to the unit 15 in Figs. 1 and 2, or by incorporating in the design and construction of the amplifier 51, by means well known in the art of electrical control, equivalent elements for effecting the desired permanent relative phase displacement between the output and input potentials of the amplifier.

The auxiliary apparatus, whereby there is applied to the motor 55 a suitably modulated retarding influence to neutralize the effects of inertia in the moving parts of the mechanism, is described as follows: Connected in the circuit of the secondary winding 62 on the transformer 60 is a diode or rectifying tube 66 having an anode and a cathode, the latter preferably grounded. In series with the diode 66 and the transformer winding 62 is a resistor 67, one end of which is connected to the ground point of the circuit, i. e. the cathode of the tube 66. Thus, at all times of unbalance of the bridge network, with a consequent alternating voltage from the secondary winding 61 tending to cause operation of the motor 55, a similar alternating voltage from the secondary winding 62 will be impressed upon the diode 66, whereby a rectifier current will flow through said diode and the resistor 67, causing a unidirectional potential gradient to be established across the same. A suitable capacitor 68, connected across the terminals of the resistor 67, will introduce a filtering effect, tending to eliminate pulsations from said potential; and, if desired, a full-wave rectifying unit may be substituted in the circuit, whereby to produce a direct current flow and a corresponding potential, variable in magnitude with the degree of unbalance of the bridge network.

A transformer 70, having a primary and a secondary winding, is adapted to be energized from a supply 71 of alternating current, having a frequency differing materially from that of the main supply source 59. A triode 72, having a cathode, rendered emissive by a heating source not shown, a grid, and a plate or anode, has said cathode connected to a grounded conductor 73 in series with a suitable biasing resistor 74. A battery 75, or other suitable source of direct current has its negative terminal connected to the grounded conductor 73 and its positive terminal in series with a suitable resistor 76, to a conductor 77 attached to the plate of the triode 72. A by-pass capacitor 78 is connected in parallel with the resistor 74, between the cathode of the tube 72 and the grounded conductor 73. The grid of the triode 72 is connected through a current limiting resistor 79 to a selected tap on the resistor 67, whereby there will be applied upon said grid a potential to the cathode corresponding to the value of current flowing in the resistor 67. The grid of the tube 72 is connected also to one terminal of the secondary winding of transformer 70 through a blocking capacitor 80, which prevents the flow of direct current in the transformer winding; and the other terminal of said winding is connected to the grounded conductor 73.

A second triode 82, having a cathode, rendered emissive by heating means not shown, a grid and a plate, has said cathode connected to the grounded conductor 73 in series with a suitable biasing resistor 83, having in parallel therewith a bypassing capacitor 84. The positive terminal of the battery 75 is connected through the primary winding of the transformer 64 to the plate of the triode 82. The grid of the triode 82 is connected through a capacitor 85 to the conductor 77, and also through a resistor 86 to the grounded conductor 73.

The operation of the motor 55 in a sense to restore a balanced condition to the bridge network has already been explained; and it has also been shown that concomitantly with the operation of the motor there will appear across the resistor 67 a unidirectional potential having a magnitude varying with that of the output of the amplifier 51, and, therefore, with the intensity of the motor operating influence. Because, however, the diode 66 in its rectifying function disregards phase position of the alternating current to which it is subjected, the unidirectional potential gradient along the resistor 67, while varying in magnitude with operation of the motor 55, will be independent of the direction of said rotation and can have only one polarity; and said polarity, with connections as indicated, will be such that the tapped point of the resistor 67 will be negative to ground, thus applying a corresponding grid potential to the triode 72. Alternating voltage derived from the secondary winding of the transformer 70 and applied between the grid and the cathode of the tube 72 in series with the capacitor 80, will affect the flow of current from the battery 75 through the plate circuit, whereby the output current will be characterized by an alternating component of frequency corresponding to that of the source 71, and as such will flow from the plate of said tube through the conductor 77, the resistor 76, and the battery 75, as well as through the resistor 74 and the capacitor 78 in parallel. The tap on the resistor 67 being suitably selected, the negative bias derived from the resistor 68 may be made such as more or less to block the flow of said current in the output circuit of the tube 72, whereby when no voltage exists across the terminals of the secondary winding 62 the grid bias of the tube 72 will be a fixed value, and as the output voltage of the winding 62 increases, said grid bias will correspondingly increase, until a value is reached at which the magnitude of the output current of the tube 72 becomes zero.

The output current of the tube 72, flowing in the resistor 76, will establish across the same a corresponding potential drop of which the alternating component will be applied through the blocking capacitor 85 to the grid of the triode 82, whereby to cause to flow in the plate circuit of the same a fluctuating current of corresponding frequency and magnitude. There will thus be set up in the secondary winding 63 of said transformer an alternating voltage which will combine with the voltage of the secondary winding 61 of the transformer 60 to produce current in the primary winding 57 of the motor 55. Because of the bias of the tube 72 varying, as previously pointed out, with the magnitude of output of the transformer 60, the output of the transformer 64 will tend to vary in a sense opposite to that of the transformer 60, with the result that, as a condition of balance in the bridge network is approached, and the driving force on the motor 55 progressively lessened, the component of current from the transformer 64 having the frequency of the source 71, is correspondingly increased. Since said component, being of a frequency other than that of the flux produced by the winding 56, and therefore contributing nothing to the torque, acts only to provide a braking or retarding influence on the rotor, as hereinbefore set forth, it follows that there has been effected the desirable result of applying to a servomotor a retarding effect which shall be a minimum or zero at the time the motor is required to operate at its greatest speed in either direction, increasing as the driving force on the motor is increased, and attaining a maximum value as the motor torque falls to zero. The rate of variation of bias of the triode 72 with respect to the output voltage of winding 62 can be controlled not only by selection of the characteristics of said triode, but by suitably selecting and coordinating the values of the resistors 67, 79 and 74. If a gradual reduction in the braking or retarding component is desired there may be used for the triode 72 a tube having a "variable mu" characteristic, well known in the art of electronics.

In copending application Serial No. 521,236, filed by W. H. Bussey Feb. 5, 1944, now Patent No. 2,444,726, there is set forth a method and apparatus whereby the non-linear characteristics of certain ferromagnetic systems may be utilized for the purpose of amplifying small unidirectional potentials such as characterize the unbalance of direct current bridge and potentiometer networks, and obtaining therefrom representative alternating currents of a nature which may be applied to the operation of a servomotor for restoring a condition of balance and providing a measure of the magnitude of the unbalance influence. It is also shown that where such a system is given suitable alternating excitation there will appear in the output various alternating components including one having the fundamental frequency and varying in amplitude and in phase position with the intensity and polarity of the unbalance potential.

In Fig. 5 is shown diagrammatically an electromagnetic unit 88 of the type set forth in said Bussey application and comprising a modulator element 89 including a ferromagnetic core structure having a middle leg 90 and outside legs 91 and 92, said legs being provided with suitable windings comprising a coil 93 on the leg 90 and mutually identical coils 94 and 95 on the legs 91 and 92 respectively. The coils 94 and 95 are interconnected with their relative polarity such that current flowing through them in series will tend to magnetize the core portions 91 and 92 in opposite sense, i. e. in a sense to make the upper end of one of said legs, as seen in the drawing, of the same magnetic polarity as the lower end of the other of said legs. The free ends of the winding composed of the coils 94 and 95 are connected through an inductive choke 98 to terminals 99, to which may be applied a D.-C. potential to be investigated, and also through a capacitor 100, which effectually bars the flow of direct current, to an amplifier 101 tuned to characteristics presently to be set forth, and thence to demodulating unit 102 having output terminals 103 and 104.

The coil 93 is supplied with exciting current from two interconnected A.-C. sources 96 and 97, producing alternating currents of high and low frequencies respectively, these currents being superimposed in the winding 93 to combine their magnetizing influences on the associated magnetic system. With the fundamental or lower frequency of the order of 60 cycles per second, it has been found that effective operation of the apparatus is obtained when the higher frequency lies in the "audio" range of which a value of 1650 cycles per second may be taken as an example. The tuning of the amplifier 101 is made such that it will pass a band of frequencies ranging from the sum to the difference of those derived from the sources 96 and 97.

It may be shown that when the two frequency components (designated as $f_1$ and $f_2$ respectively) are superimposed in an electromagnetic system as hereinbefore described, and a unidirectional unbalancing influence introduced, there will appear in the output voltage components having a number of different frequencies, among which will be those having values of $(f_2+f_1)$ and $f_2-f_1)$. If there be added to these a third component having a frequency $f_2$, the resultant voltage may be considered as a modulated wave, from which the component having the frequency $f_1$ may be recovered by the use of any one of a number of suitable demodulating networks well-known in communication practice. By virtue of the frequency component $f_2$, acting as a carrier wave, and having a much higher frequency than the fundamental $f_1$, it follows that amplification can be effected to any desired degree with correspondingly greater ease than could be done were the high-frequency component not present. Should the voltage applied to the amplifier 101 not contain a sufficiently high proportion of the high frequency component to provide the required modulation characteristics, such may be "artificially" introduced by means of a circuit 105 including a rheostat 106, deriving from the high frequency source 96 a component having a frequency $f_2$ and superimposing said component upon the output of the induction apparatus.

While it has been thought desirable to eliminate involved mathematical analyses from the present discussion, the method by which appropriate computations may be carried out are well-known in the art, and upon these may be established a number of outstanding facts: the principal of which is that the component of the output voltage having the frequency $f_1$ will vary in phase position with the direction of the D.-C. unbalancing influence, and in amplitude with the quantitative value of said influence. While the high (audio) frequency output $f_2$ will be substantially eliminated by the demodulator 102, I find it possible to obtain in the demodulator output a second harmonic component of the low frequency $f_1$ (i. e., a component having the frequency $2f_1$), which second harmonic component varies in amplitude inversely as the amplitude of the low or fundamental frequency ($f_1$) voltage in the demodulator output. This is obtained when the amplitude of the high frequency ($f_2$) and the low frequency ($f_1$) input currents are approximately equal. Thus there will remain in the demodulator output a double frequency component, which, when applied to one of the primary windings of a two-phase induction motor, will, as hereinbefore set forth, contribute nothing to the driving torque but will tend to inhibit rotation, and, when the fundamental component is eliminated will bring the rotor quickly to rest.

In Fig. 6 is shown the application, according to the principle of the invention, of an induction modulator of the type shown in Fig. 5 to operation of a servomotor in a mechanism for automatically balancing a potentiometer adapted to the purposes of pyrometry by providing a continuous measure of the E. M. F. developed in a thermocouple exposed to a temperature to be measured.

A slide-wire 107 carrying a constant current derived from a battery 108, and adjusted to a suitable predetermined value by means of a rheostat 109, is adapted to be traversed by a sliding contact 110 positioned by means of a lead screw 111 which may be driven in either direction by a reversible electric motor 112. An index or pointer 113 in cooperation with a graduated scale 114 provides a measure of the position of the sliding contact 110 with respect to the slide-wire 107. A thermocouple 115 is exposed to the temperature to be measured, and one end of said couple is connected by means of a flexible lead 116 to the sliding contact 110. To the lefthand end of the slide-wire 107, as seen in the drawing, is connected a conductor 117, and the free end of the thermocouple 115 is connected to a conductor 118.

An electromagnetic unit 119, similar in all respects to the hereinbefore described unit 88 shown in Fig. 5, includes a modulating element 120 (corresponding to element 89) and is provided with a source 121 of low frequency current and a source 122 of high frequency current, whereby there may be derived the dual excitation fully described in connection with the apparatus shown in Fig. 5. The secondary output circuit of the element 120 is provided with an amplifier 123 and a demodulator 124; and the D.-C. input terminals of the unit 120 are connected in series with a suitable inductive choke 125 to the conductors 117 and 118, and thereby included in the potentiometer circuit.

The motor 112 is preferably of the two-phase type, having two mutually displaced primary windings 126 and 127. The winding 126 is continuously excited from the source 121, whereby there is provided an alternating field in the motor. If desired, there may be placed in series with the winding 126 and the source 121 a phase-shifting device 128, whereby the phase position of the field developed by the winding 126 may be most advantageously located. The winding 127 is connected to the output terminals of the demodulator 124, and will thus, as hereinbefore set forth, receive an alternating current having a component of fundamental frequency and varying in magnitude and phase position with changes in the E. M. F. derived from the conductors 117—118.

In so far as operation on fundamental frequency is concerned, the performance of the self-balancing instrument is identical with that set forth in the above mentioned Bussey application. As the temperature to which the thermocouple 115 is exposed varies, the balance between the thermoelectromotive force derived therefrom and that corresponding to the position of the sliding contact 110 on the slide-wire 107 will be disturbed; and the differential E. M. F., appearing between the conductors 117—118 will be applied to the windings of the modulating element 120, and will cause an alternating E. M. F. having a component corresponding in frequency to that of the source 121 and dependent in magnitude and phase position upon the magnitude and polarity of the unbalanced unidirectional E. M. F., to appear at the output terminals of the demodulator 124, and to be applied to the primary winding 127 of the motor 112. The motor 112 will operate in a direction and with a velocity depending upon the phase position and intensity of the current in its winding 127, whereby said motor may be caused to position the sliding contact 120 along the slide wire 107 in a sense to reduce the unbalance; and the position of said contact, as exhibited by the pointer 123 on the scale 124 will be a measure of the temperature to which the thermocouple 115 is exposed.

As pointed out hereinbefore, I find that when the amplitude of the high and low frequency input currents from the sources 121 and 122 are approximately equal, there is obtained in the output of the demodulator 124 a pronounced alternating component having a frequency double that of the fundamental $f_1$, and furthermore having an amplitude which varies inversely with that of the fundamental frequency component in said demodulator output. The amplitude of said double frequency component is moreover independent of the phase position of said fundamental in relation to the source of supply. The current supplied to the winding 127 of the motor 112 contains therefore a component, which will apply to the rotor of the motor a retarding influence tending to be at a minimum when the deviation of the thermocouple voltage from the slide-wire potential is greatest, and to rise to a maximum as a condition of balance is approached.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for controlling an electric motor of the type having two dephased primary windings cooperative with a rotor, said apparatus comprising an induction balance, means for producing alternating magnetic fields linked with the secondary windings of said balance by applying concurrently to the primary winding alternating E. M. F.'s of substantially different frequencies but approximately equal amplitudes, means for superimposing upon portions of the magnetic circuits of said induction balance windings magnetic forces derived from a unidirectional current of magnitude corresponding to that of a variable condition and affecting said magnetic circuit portions in opposite directions, means for deriving from the output voltages of said secondary windings a voltage having the frequency of the lower of said input frequencies and a voltage having a frequency which is a multiple thereof and which varies in amplitude inversely with that of said derived lower frequency voltage, means for applying both said derived voltages to one of the windings of said motor, and means for applying to the other winding of said motor a voltage having said lower frequency.

2. Apparatus for controlling an electric motor of the type having two dephased primary windings cooperative with a rotor, said apparatus comprising an alternating current Wheatstone bridge, means responsive to unbalance of said bridge for developing an E. M. F. dependent in amplitude and phase position upon the magnitude and sense of unbalance of said bridge, means for applying said E. M. F. to one of the windings of said motor, means for applying to the other winding of said motor an E. M. F. of the same frequency as the first mentioned E. M. F., means for developing a unidirectional potential having a magnitude varying with that of said first mentioned E. M. F., and electronic means responsive to said unidirectional potential for applying to the first mentioned winding of said motor an E. M. F. of frequency different from that in the other motor winding and providing a retarding force which increases as the motor driving force decreases.

ABRAHAM WALTER JACOBSON.

REFERENCES CITED

The following references are of record in the file of this patent:

UNITED STATES PATENTS

| Number | Name | Date |
|---|---|---|
| Re. 20,568 | Bedford | Dec. 7, 1937 |
| 871,513 | Lohr | Nov. 19, 1907 |
| 1,450,339 | Smith et al. | Apr. 3, 1923 |
| 1,748,078 | Prantl | Feb. 25, 1930 |
| 2,141,056 | Watkins | Dec. 20, 1938 |
| 2,172,064 | Harrison | Sept. 5, 1939 |
| 2,273,191 | Harrison | Feb. 17, 1942 |
| 2,355,537 | Jones | Aug. 8, 1944 |
| 2,367,868 | Jones | Jan. 23, 1945 |
| 2,411,357 | Bertram | Nov. 19, 1946 |

Certificate of Correction

Patent No. 2,500,314                                           March 14, 1950

ABRAHAM WALTER JACOBSON

It is hereby certified that error appears in the printed specification of the above numbered patent requiring correction as follows:

Column 14, line 3, for "undirectional" read *unidirectional*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*